(12) United States Patent
Li

(10) Patent No.: US 11,237,798 B2
(45) Date of Patent: Feb. 1, 2022

(54) SYSTEMS AND METHODS FOR PROVIDING INFORMATION AND PERFORMING TASK

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 0 days.

(21) Appl. No.: 17/235,862

(22) Filed: Apr. 20, 2021

(65) Prior Publication Data

US 2021/0240438 A1 Aug. 5, 2021

Related U.S. Application Data

(63) Continuation-in-part of application No. 16/779,676, filed on Feb. 3, 2020, now Pat. No. 11,016,564.

(51) Int. Cl.
*G06F 3/16* (2006.01)
*G06F 3/01* (2006.01)
*G10L 17/22* (2013.01)

(52) U.S. Cl.
CPC .............. *G06F 3/167* (2013.01); *G06F 3/013* (2013.01); *G10L 17/22* (2013.01)

(58) Field of Classification Search
CPC .......... G06F 3/013; G06F 3/016; G06F 3/167; G06F 1/3203; G06Q 30/0241
See application file for complete search history.

(56) References Cited

U.S. PATENT DOCUMENTS

| | | | |
|---|---|---|---|
| 2007/0024579 A1* | 2/2007 | Rosenberg | G06F 3/038 345/156 |
| 2014/0337740 A1* | 11/2014 | Kwon | G06F 3/013 715/728 |
| 2015/0130716 A1* | 5/2015 | Sridharan | G06F 3/012 345/158 |
| 2016/0217794 A1* | 7/2016 | Imoto | G06K 9/00604 |
| 2017/0351367 A1* | 12/2017 | Popovich | G06F 3/016 |

* cited by examiner

*Primary Examiner* — Kenneth B Lee, Jr.

(57) ABSTRACT

Systems, methods, and apparatus for presenting information and performing a task using an electronic device. In an aspect, a device shows content items when a gaze is detected. In another aspect, a device shows content items when a tap and a gaze are detected. In other aspects, a device performs a task when a name, a code, and the task are detected, a gaze and the task are detected, or the task is received from another device.

20 Claims, 7 Drawing Sheets

SYSTEMS AND METHODS FOR PROVIDING INFORMATION AND PERFORMING TASK

CROSS REFERENCE TO RELATED APPLICATION

This is a continuation-in-part of U.S. application Ser. No. 16/779,676, filed Feb. 3, 2020, which is a division of U.S. application Ser. No. 15/917,625, filed Mar. 10, 2018, which is a continuation-in-part of U.S. application Ser. No. 15/802,427, filed Nov. 2, 2017, which is a continuation of U.S. application Ser. No. 15/494,464, filed Apr. 22, 2017, which is a division of U.S. application Ser. No. 14/217,486, filed Mar. 18, 2014, now U.S. Pat. No. 9,671,864, granted Jun. 6, 2017.

BACKGROUND

Field of Invention

This invention relates to providing information and performing a task, more particularly to presenting information and performing a task at a device after receiving a voice input, detecting a gaze, and/or receiving a message from another device.

Description of Prior Art

When a smartphone is standby, its display may turn dark to save energy. Without user intervention, the smartphone would stay that way. In some cases, a user may not want to play with a standby phone, because he or she may be busy doing other things. In some other cases when a user is not busy, he or she may still be reluctant to awake a phone from standby state, if there isn't anything interesting. In the latter scenario, a user may have time to take or view information, while a smartphone may have a blank screen ready to display and convey info. However, there lack convenient ways and incentives for a user to start it. As a consequence, the phone may continue to be idle, while a user may just gaze at a dark empty screen, causing a waste of time for both the user and phone.

Accordingly, there exists a need to utilize idle time of smart phone and other electronic devices to present information to idling users.

Advertisements represent a major revenue source for many internet service providers and internet companies. When users surf on the Internet or communicate with each other, however, most hold a rather negative attitude towards advertisements, which often tend to present certain content in an intrusive, disruptive, obtrusive, or even rude manner. Intrusive ads include unexpected pop-up, unwelcome or oversized banners, or annoying flashing objects or pictures. On the other hand, advertisements made to be less intrusive often end up being ignored or less effective due to a weak or subtle appearance. In both cases, either users are offended, or ad effect is in doubt.

Thus, it is desirable to have a method and system which provide advertising information in a less-intrusive but effective way. Because an idle device sometimes means an idling user, it may be less intrusive and probably more effective to present advertisements utilizing an idle device in an unused time slot. But so far most internet advertisements appear at a rather awkward time, competing with programs a user is running or annoying a user who is already busy enough.

Therefore once again, there exists a need to utilize idle time of electronic devices like smartphones or tablet computers to present information. The idle time may be especially useful for showing advertising items to idle users.

When a user utters a command to a device, the device performs a task indicated in the command. There exists a need for a user to utter a command in a simple, convenient, and natural way.

OBJECTS AND ADVANTAGES

Accordingly, several main objects and advantages of the present invention are:

a). to provide an improved method and system for presenting information and performing a task;

b). to provide such a method and system which target an idle or standby device;

c). to provide such a method and system which monitor the gaze direction of a user to determine when to present information and when to stop a presentation;

d). to provide such a method and system which use a user input such as shaking, tapping, or voice command plus a gazing act to determine when to present information;

e). to provide such a method and system which perform a task after detecting a voice input and/or a gazing act; and f). to provide such a method and system which perform a task at a first device after a second device detects a voice input and transmits instructions to the first device.

Further objects and advantages will become apparent from a consideration of the drawings and ensuing description.

SUMMARY

In accordance with the present invention, methods and systems are proposed to present information and perform a task using an electronic device. In one embodiment, when a user gazes at an idle screen of an idle device, indicating the user might not be engaged in anything, the device may take the opportunity to present news, updates, or other information. In another embodiment, when a user shakes, taps, or speaks to a standby or idling device, and then looks at it, the device may combine the shaking, tapping, or speaking act with the gazing act and consider the combination as a predetermined command to show information on a screen. In other embodiments, a task is performed at a device when a voice input includes a name, a code, and the task, a voice input includes a name and a gaze act is detected, or a user utters a command to a another device for doing the task.

DRAWING FIGURES

REFERENCE NUMERALS IN DRAWINGS

| | |
|---|---|
| 10 | Sensor |
| 12 | Database |
| 14 | Communication Network |
| 16 | Processor |
| 18 | Processing Module |
| 20 | Sensor |
| 22 | Computer Readable Medium |
| 24 | Sensor |
| 30 | Smartphone |
| 32 | Eye |
| 36 | Smartphone |
| 38 | Eye |
| 40 | User |
| 42 | User Device |
| 44 | Control Device |
| 46 | Application Device |
| 80 | Client System |
| 82 | Service Facility |

100, 102, 103, 104, 105, 106, 108, 110, 112, 114, 116, 118, 120, 122, 124, 126, 128, 130, 132, 133, 134, 136, 138, 140, 144, 146, 148, 150, 152 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
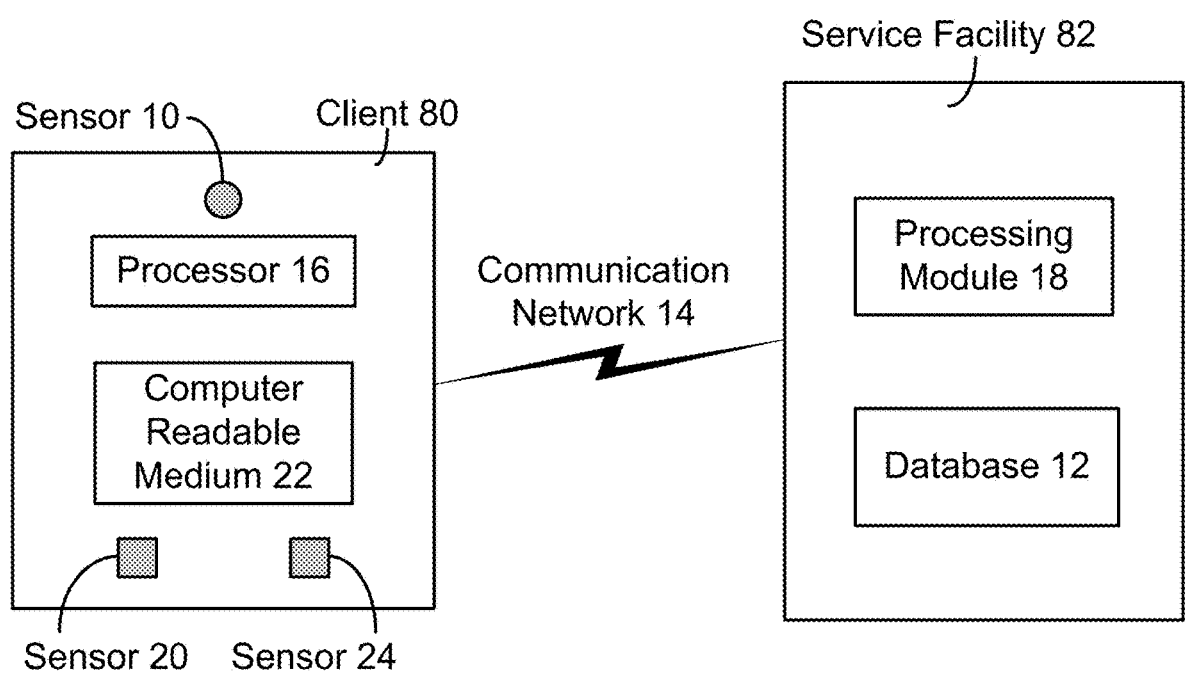
FIG. 1 is an exemplary block diagram describing an embodiment in accordance with the present invention.

FIG. 1 is an exemplary block diagram of one embodiment according to the present invention. A client system 80 and service facility 82 are connected via a communication network 14. Client 80 may represent an electronic device, including but not limited to a desktop computer, a handheld computer, a tablet computer, a wireless gadget (such as mobile phone, smart phone, smart watch, and the like), etc. Client 80 may include a processor 16 and computer readable medium 22. Processor 16 may include one or more processor chips or systems. Medium 22 may include a memory hierarchy built by one or more memory chips or storage modules like RAM, ROM, FLASH, magnetic, optical and/or thermal storage devices. Processor 16 may run programs or sets of executable instructions stored in medium 22 for performing various functions and tasks, e.g., playing games, playing music or video, surfing and searching on the Internet, email receiving and transmitting, displaying advertisements, communicating with another device, sending a command to another device (e.g., turning on another device or controlling the operation of another device), etc. Client 80 may also include input, output, and communication components, which may be individual modules or integrated with processor 16. Usually, client 80 may have a display with a graphical user interface (GUI). The display surface may also be sensitive to touches, especially in the case of tablet computer or wireless gadget. Client 80 may also have a microphone and a voice recognition component to detect and recognize audio input from a user.

Service facility 82 may include a processing module 18 and database 12. Module 18 may contain one or more servers and storage devices to receive, send, store and process related data or information.

The word "server" indicates a system or systems which may have similar functions and capacities as one or more servers. Main components of a server may include one or more processors, which control and process data and information by executing software, logic, code, or carrying out any other suitable functions. A server, as a computing device, may include any hardware, firmware, software, or a combination. In the most compact form, a server may be built on a single processor chip. In the figure, module 18 may contain one or more server entities that collect, process, maintain, and/or manage information and documents, perform computing and communication functions, interact with users, deliver information required by users, etc. Database 12 may be used to store the main information and data related to users and the facility. The database may include aforementioned memory chips and/or storage modules.

A communication network 14 may cover a range of entities such as the Internet or the World Wide Web, a local area network (LAN), a wide area network (WAN), a metropolitan area network (MAN), a telephone network, an intranet, wireless, and other types of networks. Client 80 and facility 82 may be connected to network 14 by various wired, wireless, optical, or other connections.

Client 80 may include a sensor 10 which tracks the eye of a user using mature eye-tracking technologies. The sensor may be arranged very close to the screen of a display and designed to obtain a picture of the facial part of a user. The system may recognize whether a user's gaze is in such a direction that the eye sight may fall on the display screen of client 80. In other words, sensor 10 may be employed to determine whether a user is looking at the screen of a device through proper algorithms. Sensor 10 may be built using imaging technologies, and the image of a user's eye may be analyzed to decide which direction the user is looking at. Both visible and infrared light may be employed for eye-tracking. In the latter case, an infrared light source may be arranged to provide a probing beam.

Client 80 may also include a sensor 20 which functions as a motion detector, which is well known in the art and employed at some devices already. Sensor 20 may be used to detect movement of an object outside the device. It may include a camera-like system to obtain images and then recognize any movement through image analysis over a period of time. As sensor 10 has imaging capabilities, sensor 10 may be arranged to work both as an eye-tracking device and as a motion detector, which is desirable when small size is required.

Furthermore, client 80 may contain a sensor 24 to detect its own movement by sensing acceleration, deceleration, and rotation. Sensor 24 may employ one or multiple accelerometers, gyroscopes, and/or pressure sensors for performing various measurement tasks which may include detecting device shaking, device vibration, user running, user walking, and so on.

Figure 2:
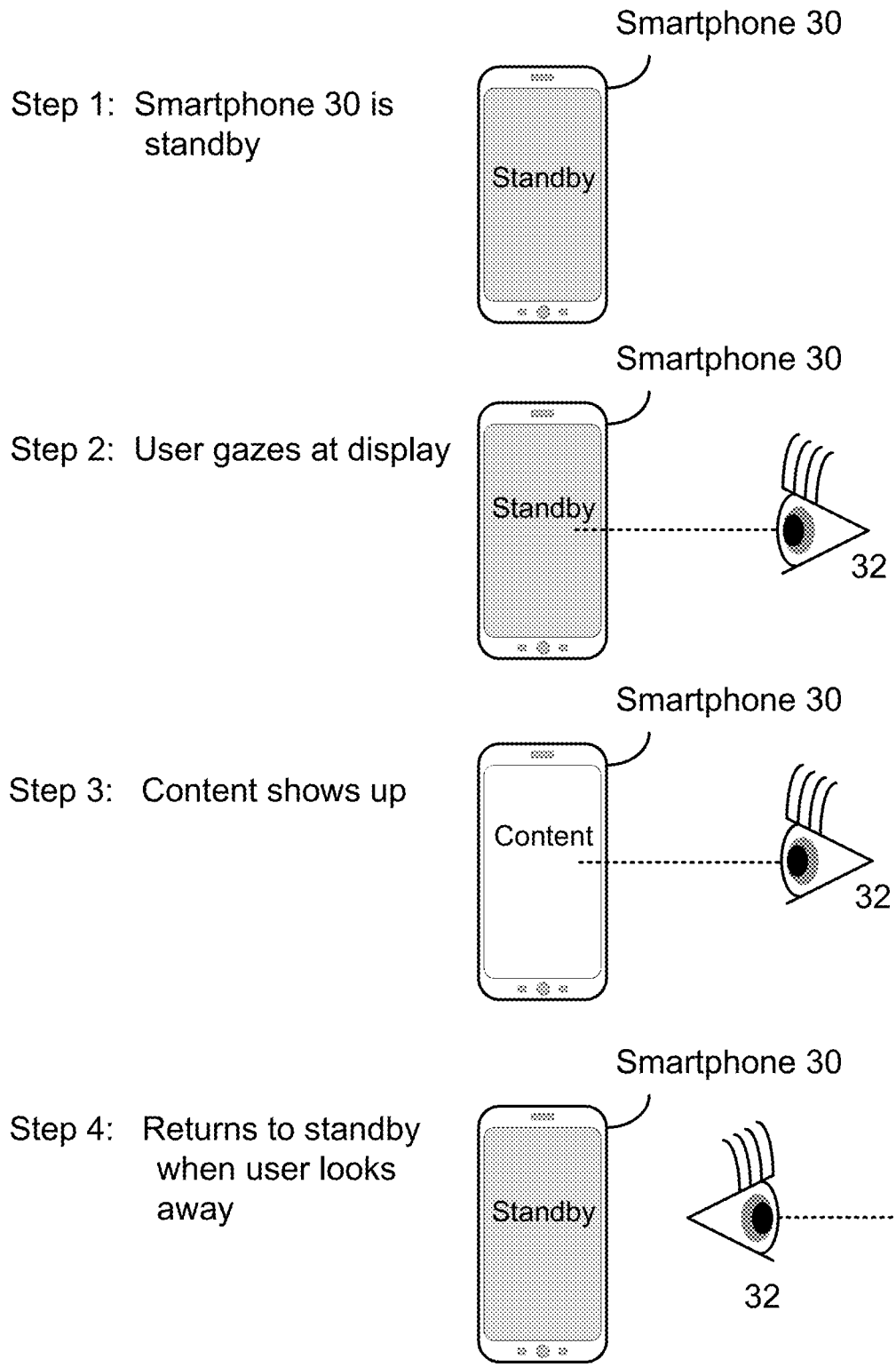
FIG. 2 illustrates exemplary diagrams showing an embodiment involving a user and a device in accordance with the present invention.

FIG. 2 shows exemplarily one embodiment according to the present invention. The essence is to utilize sleeping devices to bring info to idle users. In Step 1 of the figure, a smartphone 30 is standby or idling, with a dark screen showing nothing. In Step 2, a user gazes at the screen, reflected by an eye 32 looking at it. If the gazing time elapses beyond a certain value, it may be interpreted as the user might have spare time and might be willing to view info presented on the screen. Then in Step 3, the screen lights up and content items are presented. The user may continue to look at the screen and view the content items, or turn his or her sight away from the screen. If the user redirects gaze direction to elsewhere for a certain period of time, it may be deemed as not wanting to watch the content any more. Then the screen may turn dark and the smartphone may become idle or standby again, as depicted in Step 4.

Content items presented on an idling device may include any category of information such as breaking news, regular news, market updates, newly-arrived shared photos, email alert, text messages, video clips, advertisements, community events, sports, and so on. A user may choose what information may be presented. A user may also rely on a program and/or a service provider, which is connected to a device via communication networks, to arrange content items to be presented.

Figure 3:
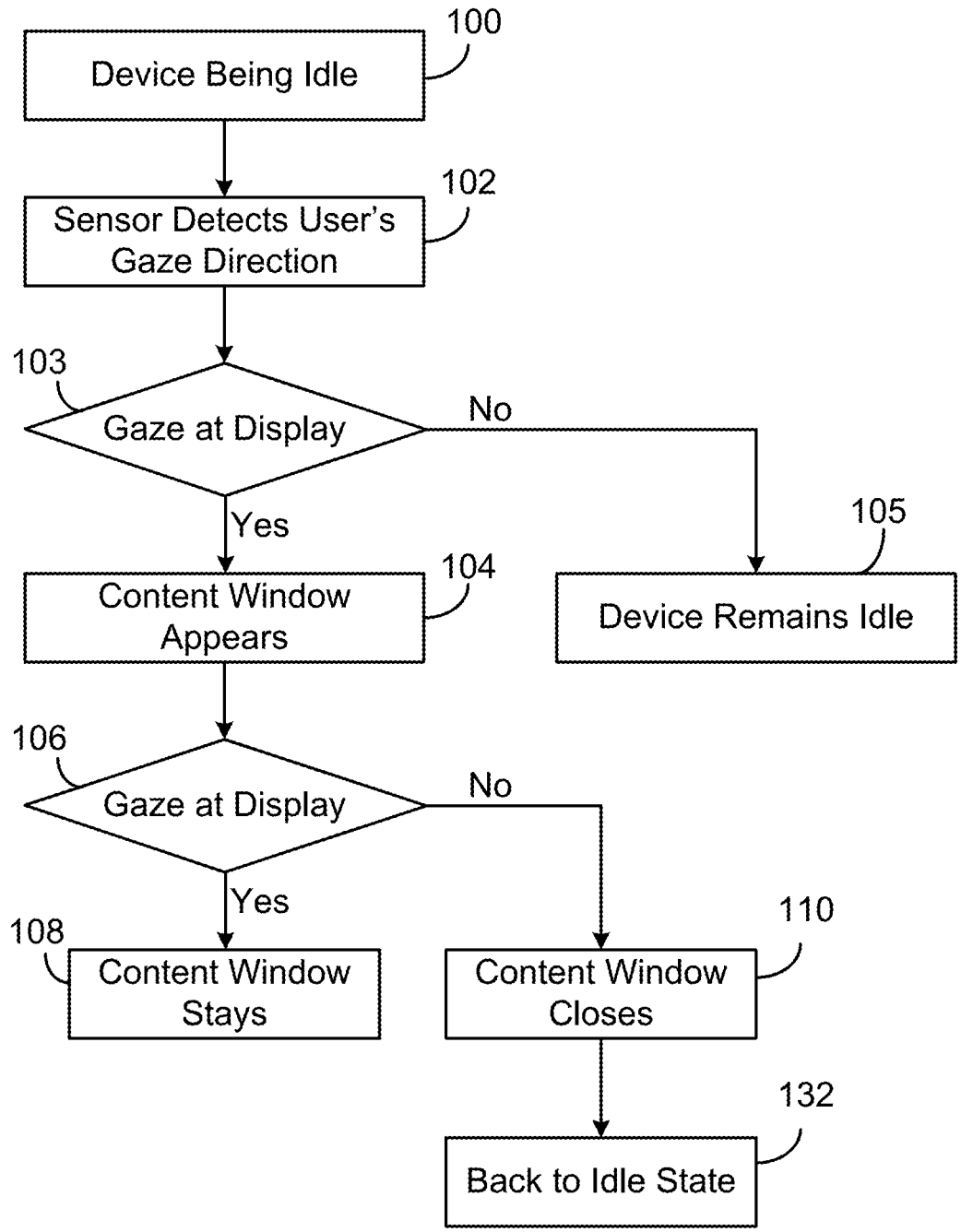
FIGS. 3, 4 and 5 are exemplary flow diagrams showing respective embodiments in accordance with the present invention.

FIG. 3 is a schematic flow diagram illustrating one embodiment of providing information according to the present invention. The process starts with Step 100, occurrence of an idle device, meaning no user is actively doing anything with it and the idle mode has been there for a while. A device being idle or standby may indicate the device has been in that state for some time, beyond a given period. Examples of idling device may include a desktop computer or tablet computer running by itself for a certain period of time without any input from users, a computer or tablet computer running on screen-saver mode, a cell phone or smartphone in standby state, i.e., ready to receive incoming calls while in a lower-power energy-saving state, or in general, a running electronic device with a lower or much lower power consumption setting and probably a blank screen if it has one, etc. Next, in Step 102, the device detects a user's gaze and analyzes whether the user looks at its display, by sensor 10 in FIG. 1 for example. In Step 103, if the user doesn't gaze at the display, the device may enter Step 105, remaining in idle or standby status. If the device detects that the user has been looking at the display for a certain period of time and its idle time is beyond a given value simultaneously, the device may be programmed to grasp the opportunity and present a content window in Step 104. The new window may show information which a user may prearrange or show content items received over the network or from the Internet, like news update, event update, real-time broadcast, etc. As the user isn't running anything at the device, it doesn't interfere with the user's activity; and since the user is looking at the screen, content presented may have a good chance to catch his or her attention. Next in Step 106, if the user moves sight away from the screen, indicating the user may be unwilling to watch it any longer, the content window may close in Step 110, and the display may return to the previous blank setting. Then the device may go back to idle state in Step 132. If the user keeps watching the content or keeps an eye on the screen, the device may stay engaged in Step 108, and the content window may remain on the screen. The content items may cover a wide range of subjects and may switch topics according to prearranged schedules.

Aside from turning idle time into informative or entertaining sessions, an idle user may also mean an opportunity for presenting certain special kinds of information. Take advertisements for instance. If an advertisement is introduced in the middle of a program which a user is running, it may offend the user due to the intrusive and disruptive nature. But if an ad is brought in at the end of a program, a user may prepare to leave or start another task, and thus may not have enough time or interest watching the ad, causing ineffectiveness of advertising effort. On the other hand, when a user is idle and is gazing at a blank screen, appearance of ads on the screen may be less intrusive and probably more acceptable and more effective. After all, the user has nothing to do and the ads may get enough attention. Moreover, the ad may have a chance to take a full screen, particularly valuable for devices having a small screen size such as smartphones. Ads presented on smartphones always have size issues due to limited screen dimension and lower priority status relative to what a user is doing or watching.

Figure 4:
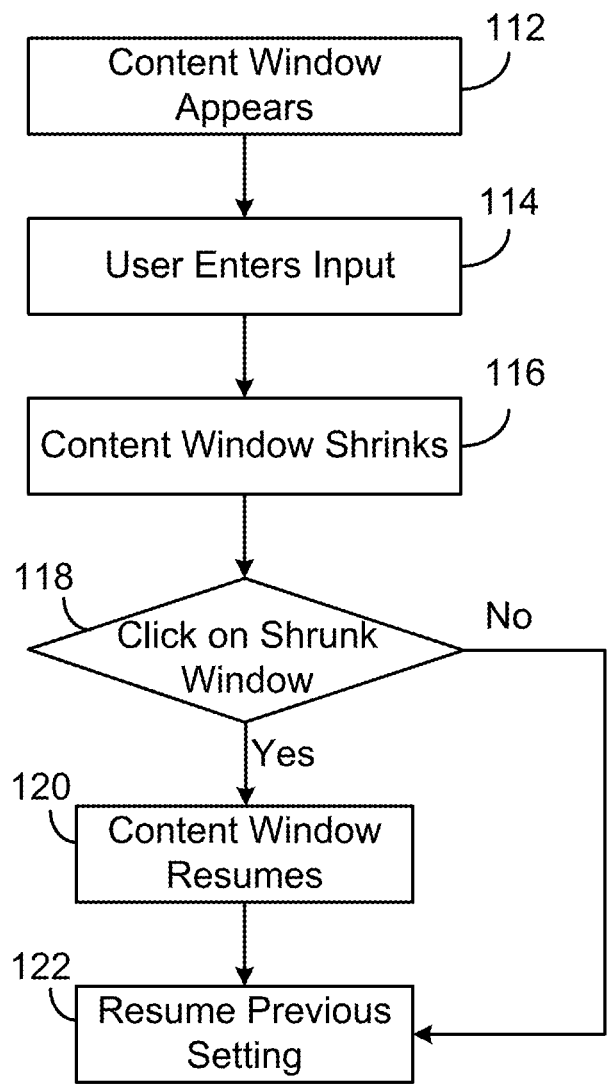

FIG. 4 is a schematic flow diagram illustrating another embodiment of presenting content items according to the present invention. In Step 112, a content window appears on a display. Occurrence of the window may be triggered by a user's gaze, like what described in the above regarding the process in FIG. 3. Content items may be chosen by service providers or pre-selected by a user, or combination of both. If a user likes the content and keeps watching it, content window may stay for a while. But if the content items are not appreciated or a user wants to run another program, he or she may want to close the window right away. Thus in Step 114, the user may take an action like pushing a button, tapping an icon on a touch-sensitive screen, or clicking on an object using a mouse. Then in Step 116, the content window shrinks to a much smaller size, or becomes an icon on the display. The window is not completely gone because a user may want to revisit it at a later time. In Step 118, if a user clicks on the shrunk window or icon, the content window may resume, and the content items may come back in Step 120. The user may start watching the previous content items, or play with the window to find more things of interest. If a user ignores the shrunk window in Step 118, the window may remain there for a given period of time and then go away, causing no nuisance to a user. In the meantime, the screen may return to the previous setting in Step 122. In the former case, after a user goes back to the content items in Step 120 and spends enough time, the user may close the window and reaches Step 122, resuming a previously paused session.

Figure 5:
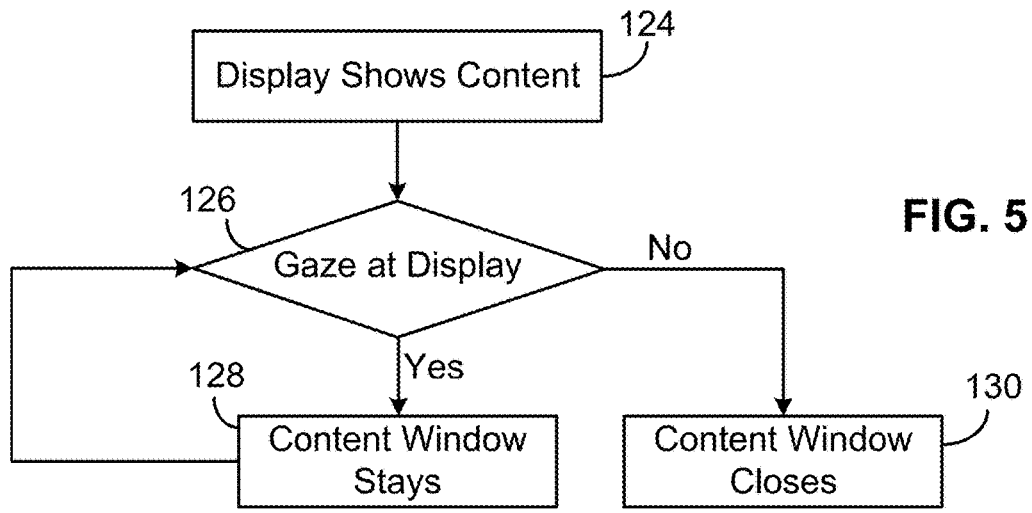

Returning to Step 104 of FIG. 3. When a user opens up a content window by gaze, he or she may watch it continuously, or close it with ease. FIG. 5 shows a schematic flow diagram to illustrate the situation in detail. In Step 124, a window is created on a display and content items are shown to a user. Meanwhile, the gaze direction of the user is monitored continuously. In Step 126, if it is detected that the user looks away from the display for a given period of time, Step 130 is implemented. The content window closes and the device may return to its idle or standby state. If the user keeps watching the display, it goes from Step 126 to Step 128, and the window remains open and content items are presented and refreshed per schedule in place. To provide convenience for a user, a cycle is designed, which consists of Step 126 to 128, then back to Step 126, and then to Step 128 or 130. As a result, a user may watch content items presented by the display on and on, and meanwhile the user may close the content window at any time by looking away from the display. Optionally, a user may reopen the window any time by looking at the display or reopen the window by running certain application designed for such a purpose. Therefore, a user may choose to watch scheduled content or walk away from it easily and conveniently.

Referring back to FIG. 1, sensor 20 may be employed to work together with sensor 10. For instance, sensor 20 may detect movement of a user. When a user approaches a device, sensor 20 may detect it and then the system may activate sensor 10 to detect the user's gaze direction. In other words, physical movement of a user may be considered as a user input to control the device. In the meantime, the device may be designed to wake up from sleep state and return to standby state after sensor 20 detects a given signal.

Since a motion detector may consume less power than an eye-tracking sensor, it saves energy and extends the battery life of a device.

Senor 24 may be used to save energy of a device too. For example, when sensor 24 detects that a device's position is unstable or changes in an unusual way, the device may be configured to turn off sensor 10. Thus under such a circumstance, its display may remain blank or in screen-saver mode even when it is gazed by a user.

Figure 6:
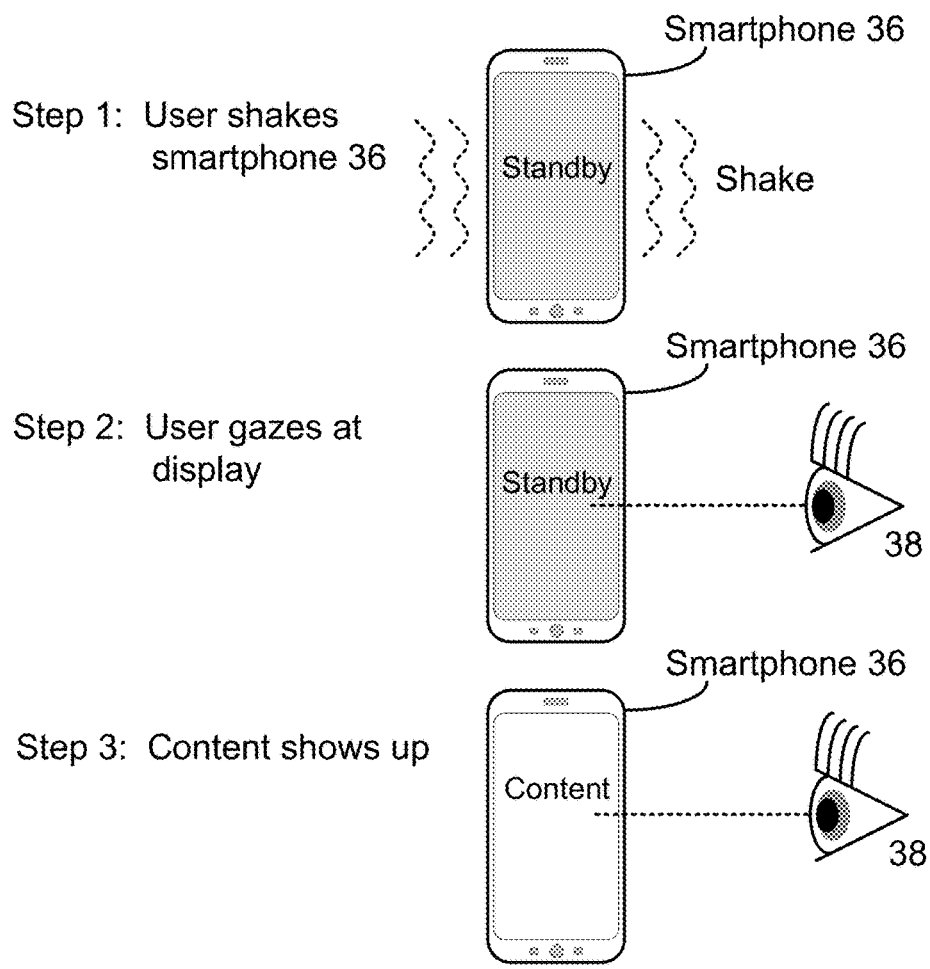
FIG. 6 illustrates exemplary diagrams showing another embodiment involving a user and a device in accordance with the present invention.

In addition, sensor 24 may be used to design another embodiment. For instance, a user may want to take initiative to lighten up a dark display and make use of standby or idle device in a simple and convenient manner. Suppose a user is looking at a blank screen of a standby smartphone 36, maybe at a subway station. The user may want to watch something to kill time, but doesn't have any idea about what to watch. So the user may follow the exemplary steps illustrated in FIG. 6 to start a content show which would be presented on the idling device. Let us assume shaking is selected as an input signal and a detector like sensor 24 is arranged to detect whether a device is shaken by a user or not. In Step 1, the user may shake smartphone 36 a bit. The shaking act is caught by the detector, which may send a signal to trigger a sensing process to ascertain whether the user gazes at the phone. For instance, a circuitry may be configured such that shaking may activate a gaze sensing system. Then in Step 2, the user may look at the phone screen or an eye 38 may gaze at it as shown in the figure, which is detected and next in Step 3, content items may show up on the screen. The content items may be selected by a service provider, including topics like instant news, weather forecast, promotions nearby, ads, and so on. Thus with a little shaking and some gazing, a user may get content items presented to him or her on an idle device instantly. Compared to the gaze-only scenario as described in FIGS. 2 and 3, the embodiment in FIG. 6 gives another option to a user. It also avoids content shows caused by unintended gaze. Probably more important, the scheme saves energy as a gaze sensing system may be off most of the time unless getting activated upon receiving shaking signals.

Besides shaking, there are many other acts or other physical movements which may be employed as the first step to work with a dark screen and to view content items on it. For instance, tapping, scribbling or sliding on a touch-sensitive screen, or tapping on certain area of a device where sensitive sensors may be placed, may also be incorporated as the first indicator that a user may want to watch something on an idle device. It may depend on a specific app or program to specify what kind of physical move may be taken as an input for a device. If there is more than one option, a user may select a method which may seem more convenient and effective.

Figure 7:
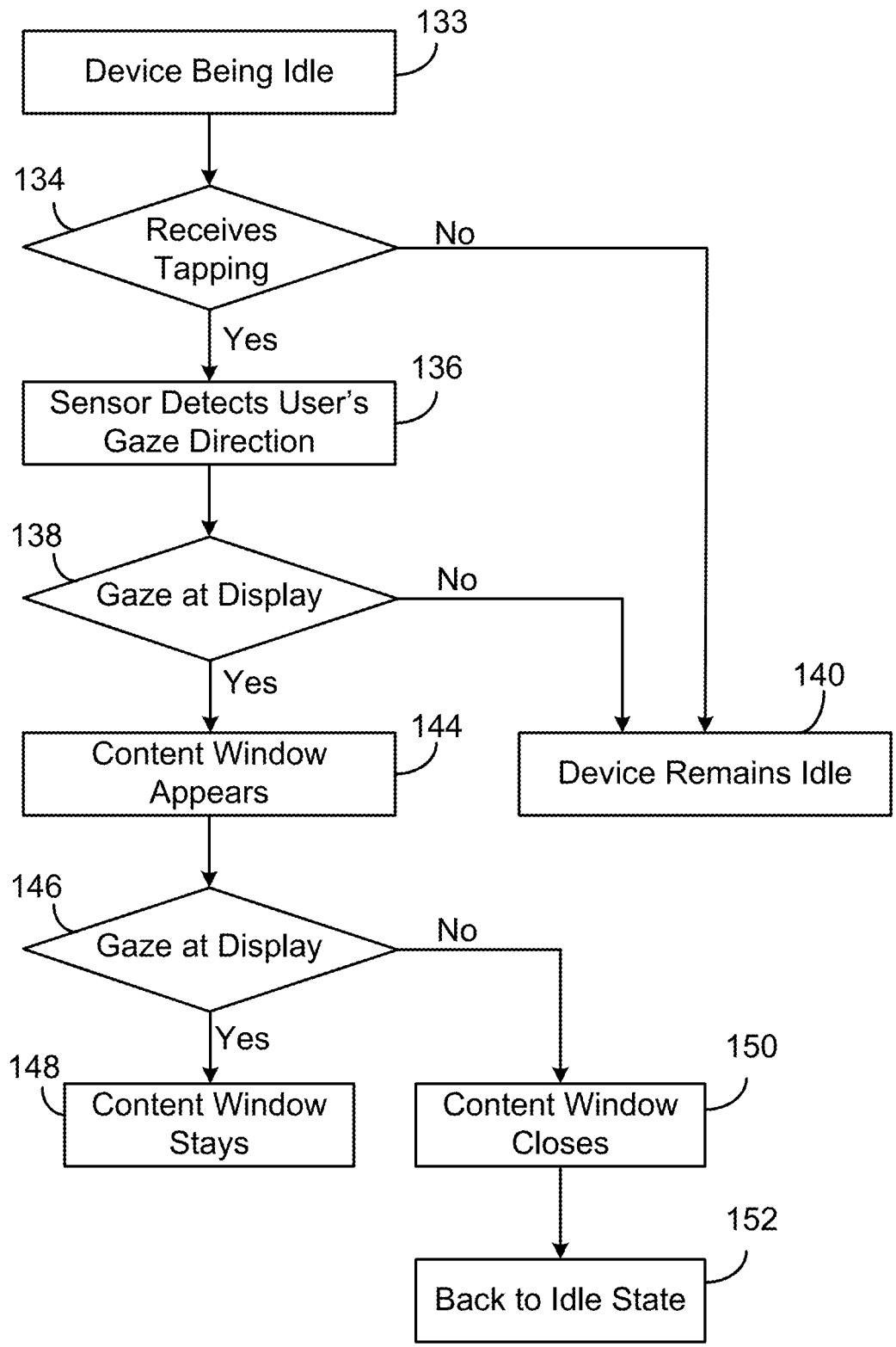
FIG. 7 is an exemplary flow diagram showing steps of the embodiment depicted in FIG. 6 in accordance with the present invention.

FIG. 7 shows an exemplary flow diagram to illustrate the embodiment depicted in FIG. 6 with more details. Assume that tapping is designated as the first signal needed. In Step 133, a device is in idle or standby mode except a tap sensor. The tap sensor, e.g., sensor 24 in FIG. 1, is powered on to detect tapping act performed by a user. A qualified tapping may be one tap or two consecutive taps with finger or hand. In Step 134, if no tapping is received, the device may stay in the original state, being idle or standby as in Step 140. If tapping is sensed, a gaze sensor may start working to detect whether a user gazes at the display in Step 136. Next in Step 138, if the user's sight is not on the display within a given period of time, the device may go to Step 140, returning to idle or standby state. If the user's sight or gaze turns to the display within a given period of time and the act lasts long enough, a content window may show up in Step 144. Then in Step 146, the gaze sensor may continue to monitor the user's gaze direction. If a user doesn't want to watch the content, his or her gaze may be directed to elsewhere away from the device. Then the content window may close in Step 150 and the device may go back to an idle or standby mode in Step 152. If the user keeps watching the content, his or her gaze stays with the device, and the content show may continue in Step 148.

Speech recognition and voice generation functions may be incorporated to make a process easy and smooth. For example, after a content window is staged by a user's gazing act, the window may be closed when a user simply says "No", if speech recognition technology is employed. Additionally, a content window may be arranged to show up quickly after a user says a predetermined word like "info" or "content" and then starts looking at the screen. A device may also generate a short speech to describe an info session after a content window is presented.

When voice recognition and gaze detection are used together, only one device, which is gazed at, may respond to a user's voice instructions. Thus a user may give a voice command to a device exclusively and conveniently by speaking to and looking at it. Without gaze detection, multiple devices may react to a voice command and it may cause a chaotic scene. Without voice recognition, a gazing act may invoke a single and often simple task only, which limits applications.

Two scenarios may exist, when voice recognition and gaze detection are used to enable interaction between a user and a device: A user may say certain word or words and then look at a device or say certain word or words and look at a device at the same time. The two actions, i.e., speaking and gazing, in both scenarios may be arranged to cause a device to carry out one or more tasks. As aforementioned, a gazing act means a user gazes at a device for at least a certain time period. The one or more tasks may be predetermined. For instance, it may be arranged that a user may say a given word or short sentence. The given word or sentence may indicate a request for one or more tasks. Then, a device may carry out the one or more tasks. A user may also say one or more sentences to describe a task and ask a device to do it. A device may use voice recognition techniques to analyze and interpret a user's voice input and obtain one or more tasks from the input.

The one or more tasks include presenting certain content items on a screen or via a speaker, turning on a device from standby or power-off state, switching from one to another working mode, implementing one or more actions specified in a voice input, and performing other given tasks. For brevity purpose, only one or two tasks are cited when discussing voice-related examples below, where other tasks may be applied without mentioning. Content items presented using or at a device may be related to a location, scheduled by a user, arranged by a remote facility or service center, or specified in a voice input. The content items may have video, audio, or another format and may be subscribed with fees or sponsored by an entity. A device may present content items using a display, a speaker, or other output components. Initially, the device may be at a standby, sleeping, power-off, or power-on state. In some applications, whether or not a user gazes at a device may be detected. In other applications, whether or not a user gazes at a device's display, speaker, or another output component may be detected. For brevity reasons, only the former case, i.e., gazing at a device, is mentioned in discussions below.

When a device is ready, a voice recognition system may be powered on and monitor a user's voice input via a microphone from the beginning. A gaze detection system may be turned on in response to receiving a user's voice input. A gaze detection system may also be powered on all the time.

In both scenarios, a user's verbal instructions are carried out when a device detects that the user gazes at it. Hence a user's command may not be carried out, if the user is out of sight, i.e., the user's gazing direction can't be ascertained. For instance, when a user shouts a few words as a command from another room and a device can't find the user in sight, the device may not follow the command to do a task even though the device may get the command from a voice recognition system. Similarly, a device may not implement a task if the task is obtained from a voice output generated by another device, such as a television, a speaker, or a smartphone, since a corresponding gaze doesn't exist and thus can't be detected.

When a name is assigned to a device by default or a user, such as "DJ", the device may be arranged to perform a task after it receives a voice command which contains the name and the task. As used in descriptions below, a name of a device may include a name that is assigned to the device and/or a name of a program or app that runs or operates at the device. The program or app may be installed at the device. When a name of a device is "DJ", examples of corresponding voice commands include "DJ, turn on the lights". The exemplary command comprises the predetermined name and a task and the device may do the task after receiving the command. Mature voice recognition techniques may be used to interpret a voice command. Sometimes, one or two sentences containing a name and a task may come from a television, when it presents a movie or advertisements. Such a case may be rare, but it does have a chance to happen and may become an issue. Thus, there exists a need to avoid taking a voice command from a machine. It may be arranged that a device ascertains whether a voice input comes from a user, after it gets the input which contains a predetermined name and a task. If the device detects that the input is from a user, it performs the task; otherwise, the device declines to do the task and the input may be discarded.

Locating techniques are needed to detect whether a voice input comes from a user. For instance, a device may have a locating detector to measure the source of a voice and then ascertain whether a target at the source is a user or a machine. The ascertaining step, or identifying step, may be performed using mature identity recognition technologies. A locating detector may measure and analyze sound waves of a voice input and then calculate a source position of the voice input via algorithms using mature methods. An identity recognition system may use a camera to take pictures of a target at the source position. Whether the target is a user or not may be determined by analyzing the pictures via algorithms and mature techniques. If the target is a user (or a person), it may be considered that the voice input is generated by the user. A device may be arranged to follow instructions only after it is detected that the instructions are from a user. When a device receives a voice command from a user who is out of sight, like in another room, the device may be configured to ignore or discard the command as it can't determine the command is from a user, even though the command contains a name of the device and does come from a user.

In some cases, however, we may want a device to control another device via a voice command. In some other cases, we may want to tell a device to do a task when we are not in sight. For instance, a user may set up a wake-up alarm at a smartphone. When the alarm sounds in the morning, it also produces a voice output, like "DJ, turn on the lights", where DJ is the name of a device. Then the device may switch on light bulbs in a room. Sometimes, we may want to shout to issue a command without seeing a device, which means the device can't see us either. In such cases, we want a device to follow a voice command without ascertaining whether the command comes from a user. Thus, there exists a need for a device to follow a voice command unconditionally, or a need of a specific type of command which a device follows without checking any factors related to a user.

A specific type of command may contain three items: A name, a code, and a task. The name is an assigned name as aforementioned. The code functions as a label. When a device receives a voice command containing a predetermined name, it may ascertain whether the voice is from a user via locating and identification means. When the device detects that the voice comes from another device, somewhere out of sight, or multiple sources (such as multiple speakers), it may be arranged to decline to follow the command. In other words, the device may be arranged to implement the command only when it is detected that the voice comes from a user.

When the device receives a voice command which contains a predetermined name, a code, and a task, it may follow the command without ascertaining anything related to a user, like whether the command is from a user or not. A code may be selected and decided by a user. It may be a simple one which is easy to use and remember. A code may include a numerical number, a word, a phrase, a short sentence, or a mixture of numbers and letters. Examples of codes include 123, 225, bingo, listen, "it's me", and so on. Assume that an assigned name is "DJ" and a code is "it's me". Examples of voice commands include "DJ, it's me, turn on air conditioning." When a device receives the command, it gets the name, code and task via a voice recognition system. Since the command has the name and code, there is no need to detect where it comes from or verify any things. The device may turn on an air conditioning system promptly.

To accommodate various cases and different needs of users, the following method may be arranged. Assume that a device has a voice recognition system for sensing, receiving, and interpreting a voice input. The system is powered on at the beginning. The device also has a gaze detection mechanism or sensor for detecting a user's gaze direction, a locating mechanism or sensor for detecting a source position of a voice input, and an identification mechanism or system to detect whether a target is a user or a machine. The above mechanisms may be in operational mode from the beginning or triggered individually by a signal after a voice input is received.

Assume a name and a code are assigned to the device. The device receives a voice input at the beginning. Content of the input may be obtained through the voice recognition system. There are three situations and five options. In situation 1, it is detected that the voice input contains the name, the code, and a task. There is one option, option 1, provided for a user. If option 1 is selected or enabled, the device performs the task right away after receiving the input, since it contains the name and the code. For instance, a user may say a name first, followed by a code, and one or more sentences to describe a task at last. Aforementioned example "DJ, it's me, turn on the lights" has such a sequence along a timeline. Once a device receives the input, the task is performed without the needs of checking anything else. Alternatively, a user may say the name first, then a task, and finally the code. For instance, a user may also say "DJ, turn on the lights, it's me". The code "it's me" is placed behind the task in the sequence. In yet another configuration, a code may come first, like "It's me, DJ, turn on the lights." When a device receives a voice input, it may search and recognize three items: a predetermined name, a code, and a task, regardless of a sequence of the items in the input. As long as a device gets the three items, it is configured to carry out the task when the name and code match a given profile respectively.

In situation 2, the voice input contains the name and a task. There are three options provided for a user. In option 2.1, the device is configured to do the task when the input contains the predetermined name and the task. In option 2.2, the device is configured to do the task when the input contains the predetermined name and the task and the input comes from a user. When the device receives the voice input, it measures where the voice comes from and then ascertains whether a target at a source of the voice is a user. If the target is not a user, the task is not performed. In option 2.3, the device is configured to do the task when the input contains the predetermined name and the task and it is detected that a user gazes at or looks at the device. When the device receives the voice input, it detects the gaze direction of a user. If the user doesn't gaze or look at the device, the task is not carried out. In addition, the sequence of a name and a task along a timeline doesn't matter, as long as the name is correct. For instance, a user may say "DJ, turn off lights" or "Turnoff lights, DJ". A device may follow both orders and turn off lights.

In situation 3, the voice input contains a task only and doesn't include the name and the code. There is one option, option 3, arranged for a user. When option 3 is chosen, the device performs the task after receiving the input, sensing a user, and determining that the user gazes or looks at the device. The device declines to do the task if it is detected that the user doesn't gaze or look at the device. In situations 2 and 3, when it is detected that a user "gazes or looks at the device", it means the user gazes or looks at the device when the user is submitting the voice input or within a given time period after the user submits the voice input.

A user may select one, two, or three options each time. For instance, a "Setup" button may be configured on a touch screen of a device. A user may tap the button to open a setup window, where the user may tap check boxes to make selections. A user may choose a single one among the five options to cover one situation only. If a user selects option 1, the device performs a task only after it obtains the name, the code, and the task from an input. If a user selects option 3, the device executes a task only when the user says the task and gazes or looks at the device.

A user may also select two options to cover two situations. Since options 1 and 2.1, 2.1 and 2.2, 2.1 and 2.3, 2.2 and 2.3, 2.3 and 3 overlap each other respectively, there are five possible cases. The five cases include options 1 and 2.2, 2.3, or 3, options 3 and 2.1 or 2.2. If options 1 and 3 are selected, for instance, a task is performed when a voice input contains the name, the code, and the task or a voice input contains the task and it is detected that a user gazes or looks at the device.

In addition, a user may select three options to cover all three situations. The three selections contain options 1, 2.2, and 3. A task may be performed when a voice input contains the name, the code, and the task, a voice input contains the name and the task and it is detected that the voice input comes from a user, or a voice input contains the task and it is detected that a user gazes or looks at the device.

Figure 8:
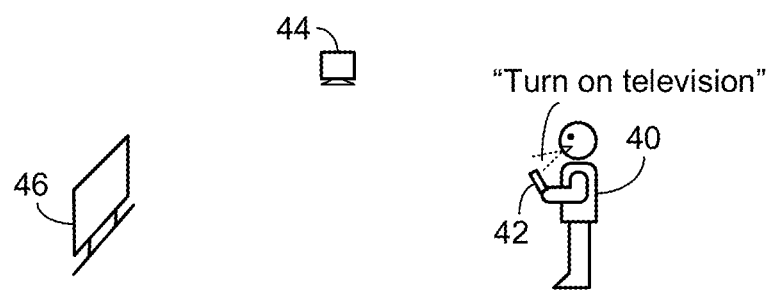
FIG. 8 illustrates an exemplary diagram showing another embodiment involving a user, a user device, a control device, and an application device in accordance with the present invention.

FIG. 8 is a schematic diagram illustrating embodiments of using multiple devices to implement a command and perform a task according to the present invention. Assuming that a user 40 carries a user device 42. User device 42 is associated with user 40 and may include a portable device or wearable device such as a smartphone, a smart watch, a smart band, smart glasses, and the like. A control device 44 may implement a command and perform a task. Control device 44 may also transmit instructions to another device such as an application device 46. Application device 46 may take instructions from control device 44, implement the instructions, and perform a task indicated in the instructions. User device 42 and control device 44 each may have a speech recognition mechanism, a microphone, and an identity recognition mechanism (e.g., a facial or fingerprint recognition system). User device 42 and control device 44 may perform speech and/or identify recognition functions using own processors and/or a server at a service facility. Assuming that user 40 has logged in user device 42. Control device 44 and user device 42 are connected and may communicate with each other. As such, in some embodiments, an input obtained via user device 42 (e.g., an input obtained through a touch sensitive screen of user device 42 or a voice input received at user device 42) may be shared by user device 42 and control device 44, and considered as instructions provided for user device 42 and control device 44 by user 40.

User device 42 and control device 44 may be connected and communicate with each other in various ways. For example, user device 42 and control device 44 may be connected by a network (e.g., a Wi-Fi network), a connection (e.g., a Wi-Fi connection), or a router (e.g., a Wi-Fi router). Once being connected, they may communicate with each other. In addition, user device 42 may log in control device 44 directly via Bluetooth or other suitable communication technologies. User device 42 may also log in control device 44 indirectly, such as logging in a system that is connected to control device 44. After user device 42 logs in control device 44 directly or indirectly, the two devices are connected.

Referring to FIG. 8. Assuming that application device 46 is a television. User 40 may utter a voice input such as "Turn on television" to user device 42. "Turn on television" is a command, and a task as well. The task may be performed at application device 46. If user device 42 is arranged to operate application device 46 directly, user device 42 may implement the task. If user device 42 is not arranged to work with application device 46 directly, it may send a message to control device 44, when control device 44 is configured to do the task. User device 42 may extract the task from the voice input using a speech recognition mechanism. In some embodiments, the message sent from user device 42 to control device 44 may include a text message and a voice message that contains data of the voice input (e.g., data of the digital recording of the voice input). Alternatively, the message may only contain the text message or the voice message.

In some cases, a voice recognition function of user device 42 may be enabled and kept in active state after user device 42 is unlocked by user 40. Unlocked user device 42 may indicate a system that user 40 has logged in. As such, any input, e.g., a voice input received at user device 42, may be considered as instructions from user 42. Hence, after control device 44 receives a command to do a task from a text or voice message from user device 42, there is no need for control device 44 to authenticate the command, and thus control device 44 may perform the task in response to reception of the command. For example, control device 44 may not need to verify whether the input is from a person or whether the input contains a predetermined code before performing the task.

In some embodiments, the method with reference to FIG. 8 may be combined with other methods illustrated above to provide more ways for a user to do a task at a device. As described above, user 40 may utter a command to control device 44 directly, which may cause control device 44 to perform a task at control device 44 or at application device 46. Alternatively, user 40 may issue a command to control device 44 via user device 42 and indirectly order control device 44 to perform a task at control device 44 or at application device 46. For example, options 1, 2.2, and 3 as described above may be combined with the method with respect to FIG. 8 to provide four options for a user. That is, a task may be performed by device 44 when device 44 receives or detects a voice input that contains a name of device 44, a predetermined code, and the task, receives or detects a voice input that contains a name of device 44 and the task and detects that the input comes from a user, receives or detects a voice input that contains the task and detects that a user gazes or looks at control device 44, or receives the task from user device 42. Optionally, any two or three of the four options may be selected by a user to form alternative combinations as alternative methods. For example, a task may be performed by device 44 when device 44 receives or detects a voice input that contains a name of device 44, a predetermined code, and the task, or receives the task from user device 42. For users who want to do a task without using a predetermined code and a gaze act, other arrangements may be configured. For example, a task may be performed by device 44 when device 44 receives or detects a voice input that contains a name of device 44 and the task, or receives the task from user device 42.

As illustrated above, after user device 42 detects a voice input from user 40, user device 42 may send to control device 44 a text message, a voice message, or both the text and voice messages. The text message may contain a command obtained from the voice input through a speech recognition method by user device 42. The voice message may contain a digital recording of the voice input. In the first scenario when control device 44 receives only the text message, control device 44 may implement the command such as performing a task indicated in the command. In the second scenario when control device 44 receives only the voice message, it may obtain or extract a command from the voice message using speech recognition and then implement the command. In the third scenario when control device 44 receives both the text and voice messages, there are two options. Control device 44 may implement a command obtained from the text message. Alternatively, control device 44 may get instructions from the voice message via speech recognition, compare the command from the text message with the instructions, and then implement the command if the command matches the instructions, or implement the instructions when the command and the instructions do not match.

In some embodiments, during or after implementing a command or performing a task, control device 44 may transmit a reply message to user device 42. The reply message may work as a summary or report that is a response to reception of the text and/or voice message from user device 42. The reply message may include the command and/or task (e.g., a name of the task or descriptions of the task) performed via device 44. The reply message may also indicate device 44 performed the task or another device (e.g., application device 46) performed the task, and include time information about the command and task, and location information when location data is available. The time information may contain a time around which the command and/or task is performed. The location information may contain location data of control device 44 and/or application device 46. User device 42 may store user data such as commands and tasks performed via control device 44, the time information, and the location information. The user data may be stored at user device 42 and/or a service facility. User device 42 may use the user data to facilitate interpretation of a voice input when the voice input contains an incomplete command. For example, user 40 may utter "Television" as a verbal command, or in another case, only one word "television" may be recognized from a voice input. As "television" only represents a keyword of a command or task, the verbal command indicates an incomplete command, and cannot be treated as an executable command by user device 42 and control device 44 using conventional recognition methods. However, if user device 42 has user data including past voice input received from and past commands performed for user 40, user device 42 may find that user 40 submitted tasks such as "Turn on television" and "Turn off television" respectively at least a number of times within a period of time (such as one to six months). Hence, user device 42 may send a message to control device 44 and request control device 44 to turn on the television if it is off or turn off the television if it is on. Hence, records of past commands and activities may be utilized by user device 42 to convert an incomplete command into a suitable command when the incomplete command only contains one or a few keywords. In some cases, control device 44 may also store data of user activities and use the data in similar ways to process incomplete commands when permitted by user 40.

In some cases, user device 42 may receive or detect a voice input from user 40 and control device 44 may receive or detect a voice signal in the same time period. Thereafter, user device 42 may transmit a text and/or voice message containing a first command to control device 44. The first command is from the voice input and speech recognition may be used in interpretation by user device 42. In the meantime, control device 44 may obtain a second command from the voice signal through speech recognition. After receiving the message from user device 42, control device 44 may get the first command from the message and compare the first command with the second command to obtain a comparison result. If it is determined that the first and second commands are the same or similar, control device 44 may implement the first or second command. If the first command is incomplete and the second command is a complete command, control device 44 may implement the second command. If the second command is incomplete and the first command is a complete command, control device 44 may implement the first command. If the first command and the second commands are two complete but different commands, there are two options from which a user may select. In the first option, control device 44 may implement the first command. A message may be displayed on a screen of user device 42 to show the two commands and inform user 40 that the first command is performed, while the second command is not implemented. In the second option, control device 44 may implement the second command. A message may be displayed on the screen of user device 42 to show the two commands and inform user 40 that the second command is performed, while the first command is not implemented.

Optionally, after receiving a voice input and before transmitting a text and/or voice message containing a command to control device 44, user device 42 may authenticate user 40. In some embodiments, a text and/or voice message containing a command may be transmitted from user device 42 to control device 44 only after user 40 is identified or recognized. User device 42 may use a facial recognition mechanism to recognize user 40. Alternatively, user device 42 may have a voice recognition system that may be arranged to verify that the voice input matches specific features (e.g., voice print information) of user 40's voice and the verification result may be used to identify user 40. In addition, user device 42 may identify user 40 by a fingerprint verification method. By identifying user 40 before transmitting a command to control device 44, it may protect the privacy of user 40 and prevent an unauthorized user from accessing control device 44 and performing certain tasks.

CONCLUSION, RAMIFICATIONS, AND SCOPE

Thus it can be seen that systems and methods are introduced for presenting information and performing a task at an electronic device.

The improved methods and systems have the following features and advantages:
(1). An idle or standby device is used to present content items to a user;
(2). Gazing direction is used to determine when to present content items and when to stop it;
(3). User input such as shaking, tapping, or speaking to a device is combined with a gaze detection to determine when to present content items;
(4). Detection of a name, a code, and/or a gaze is used to determine when to perform a task; and
(5). A user input at a device is transmitted to another device for the other device to perform a task.

Although the description above contains many specificities, these should not be construed as limiting the scope of the invention but as merely providing illustrations of some of the presently preferred embodiments. Numerous modifications will be obvious to those skilled in the art.
Ramifications:

A presentation method based on eye-tracking or gaze-sensing technologies may be applied to cell phone, smart phone, smart watch, tablet computer, laptop computer, desktop computer, television, game player, digital billboard, or any other electronic devices or systems having a display and certain computing power.

Ambient light sensor may be added to a device to sense ambient light intensity, which may be used to determine whether the device is in a pocket or bag. If a device is not pulled out, measurement results of a motion sensor may be ignored in applications discussed.

A content window may be configured to close by itself when certain motion is detected by accelerometer or gyroscope sensors, even though a user is still watching the screen, as it is uncomfortable to view any content, or inappropriate to show any content in such conditions.

Moreover, a device may be equipped with a facial recognition system to create an extra layer of protection. The system may at least recognize a device owner, which may protect a user's privacy by not following other people's instructions, or may be used to present different information to different users according to prescheduled plans. For instance, the system may be used to identify a user against given facial criteria. If an identification process fails to provide a positive result, any input received from the user may be discarded. No matter what the user does, an operational state or inactive state of a device is not affected by the user's action. It also means that a user has to be in sight so that a device may ascertain the user and perform an identity verification process. The system may make use of a camera which is employed by gaze detection to get dada and employ facial recognition algorithms to identify a user.

To trigger a content window by a gazing act, a user may also look at things located outside a display but close to its edge, instead of looking at the display directly. The reason is that, when a user looks at objects close to a display, content shown on the display may also reach the eye, thus providing a viewing opportunity anyway. And hopefully, the user may turn his or her sight a bit to get a better reception of the content. Moreover in many cases, instead of display, it may be enough to trigger a content show if a user just looks at an idling device for a given period of time, because it may mean both parties are available and the user may have a good chance to notice content items displayed on the device. In cases of smartphone and tablet computer, gazing at a device is almost equivalent to gazing at a display, because for these devices, a display may covers the whole area of one side.

Lastly, a method may be configured which ascertains whether a user faces a device, instead of gazing at a device. In some applications, it may be difficult to sense a user's eye movement, due to technical issues or ambient lighting conditions. Thus it may be arranged to detect whether a user faces a device. For instance, a device may use an imaging sensor like camera to take pictures or videos of a user. Certain algorithms may be used to identify facial features of the user, determine positions of the user's eyes, and then calculate a distance between a spot of the device and one eye and another distance between the spot and the other eye. The spot may be a point at the center of the device or the center of an output component. If difference of the two distances is smaller than a given value, it may be considered that the device is right in front of the user or the user faces the device. Consequently, it may be configured that in all of above discussions, a gazing requirement may be replaced by a facing requirement when a user or entity decides to do so. For instance, a requirement of gazing at a device may become a requirement of facing a device.

Therefore the scope of the invention should be determined by the appended claims and their legal equivalents, rather than by the examples given.

The invention claimed is:

1. A method for implementing instructions from a user at a first electronic device, comprising:
   1) receiving a voice input at the first electronic device and obtaining a command from the voice input using a voice recognition technique or receiving a first message from a second electronic device associated with the user and obtaining a command from the first message, wherein the second electronic device is connected with the first electronic device and the command includes a task;
   2) in response to obtaining the command, perform the task via the first electronic device; and
   3) in response to reception of the first message from the second electronic device, transmitting a second message from the first electronic device to the second electronic device, wherein the second message includes the task that is performed via the first electronic device.

2. The method according to claim 1, wherein the voice input includes a name of the first electronic device and the task.

3. The method according to claim 1, wherein the voice input includes a name of the first electronic device, a predetermined code, and the task.

4. The method according to claim 1 further including detecting a source location of the voice input by measuring and analyzing sound waves.

5. The method according to claim 4, wherein it is detected that the voice input comes from the user.

6. The method according to claim 1 further including detecting a gaze direction of the user by the first electronic device.

7. The method according to claim 6, wherein it is detected that the user looks at a direction toward the first electronic device.

8. A method for processing a voice input at a first electronic device, comprising:
   1) receiving the voice input from a user at the first electronic device;
   2) obtaining a command from the voice input using a voice recognition technique, wherein the command includes a task;
   3) transmitting a first message from the first electronic device to a second electronic device that is connected with the first electronic device, wherein the first message comprises the command that includes the task;
   4) receiving a second message from the second electronic device after transmitting the text message, wherein the second message includes the task and a time around which the task is performed via the second electronic device; and
   5) in response to reception of the second message, storing at the first electronic device data of the task and the time around which the task is performed.

9. The method according to claim 8, wherein the first electronic device is connected with the second electronic device via a network, a connection, or a system.

10. The method according to claim 8, wherein the first electronic device is connected with the second electronic device after the first electronic device logs in the second electronic device.

11. The method according to claim 8, wherein the task is executed or implemented at a third electronic device via the second electronic device.

12. The method according to claim 8 further including obtaining the command from the voice input using records of the user, wherein the records include commands performed for the user in the past.

13. The method according to claim 8 further including recognizing voice of the user using a voice recognition method.

14. The method according to claim 8 further including identifying the user using an identity recognition technique.

15. A method for implementing instructions at a first electronic device, comprising:
   1) receiving a voice input from a user at the first electronic device and obtaining a first command from the voice input using a voice recognition technique, wherein the first command includes a first task;
   2) receiving a first message from a second electronic device associated with the user and obtaining a second command from the first message, wherein the first electronic device is connected with the second electronic device and the second command includes a second task;
   3) comparing the first command with the second command; and
   4) in response to that the first command and the second command are same or similar, perform the first command or the second command via the first electronic device.

16. The method according to claim 15 further including in response to that the first command is incomplete, performing the second command.

17. The method according to claim 15 further including in response to that the second command is incomplete, performing the first command.

18. The method according to claim 15 further including in response to that the first command and the second command are different, performing the first command.

19. The method according to claim 15 further including in response to that the first command and the second command are different, performing the second command.

20. The method according to claim 15 further including transmitting a second message to the second electronic device in response to reception of the first message, wherein the second message includes the first command or the second command that is performed via the first electronic device.

* * * * *